United States Patent [19]
Goldman

[11] Patent Number: 5,842,284
[45] Date of Patent: Dec. 1, 1998

[54] TAPE MEASURE WITH FINGER GRIP AND FINGER GUARD GUIDE

[76] Inventor: Jay R Goldman, 72 Aspen Dr., Woodbury, N.Y. 11797-3022

[21] Appl. No.: 820,899

[22] Filed: Mar. 19, 1997

[51] Int. Cl.⁶ .............................. G01B 3/10; B43L 13/02
[52] U.S. Cl. .................................. 33/760; 33/42; 33/759; 33/770
[58] Field of Search ................................. 33/760, 42, 755, 33/757, 758, 759, 761, 764, 768, 770, 668

[56] References Cited

U.S. PATENT DOCUMENTS

| | | | |
|---|---|---|---|
| 1,164,347 | 12/1915 | Hodes | 33/770 |
| 1,186,853 | 6/1916 | Smith . | |
| 2,574,272 | 11/1951 | McCully | 33/770 |
| 3,192,630 | 7/1965 | Dineson | 33/42 |
| 3,336,674 | 8/1967 | Higgins et al. | 33/760 |
| 3,611,576 | 10/1971 | Quenot | 33/770 |
| 3,744,134 | 7/1973 | Zima, Jr. | 33/768 |
| 4,574,486 | 3/1986 | Drechsler . | |
| 5,189,801 | 3/1993 | Nicely | 33/42 |
| 5,349,760 | 9/1994 | DeVito | 33/668 |
| 5,367,785 | 11/1994 | Benarroch | 33/767 |
| 5,390,426 | 2/1995 | Hull . | |

Primary Examiner—Christopher W. Fulton
Attorney, Agent, or Firm—Michael I. Kroll

[57] ABSTRACT

A tape measure including a casing defining an enclosure with a front wall having a blade aperture adjacent a bottom wall. A rule blade is normally retractably stored in a coiled condition within the enclosure having an inner end thereof secured within the enclosure and an outer end protruding through the blade apreture. Graduated indicia markings are positioned along the length of the rule blade functioning as a measuring scale. A lock and automatic rewind switch are carried on the front wall keeping a portion of the rule blade in an extended locked until the switch is manually operated retracting the rule blade into the enclosure. An end hook is attached to the outer end of the rule blade and is adapted to be normally laid over an edge of a flat item to be measured. A device is positioned on the end hook for stabilizing a marking/cutting tool allowing the marking/cutting tool to be grasped for making a mark, score/cut line across the flat item. A device is positioned on the casing for protecting an index finger of a person holding onto the casing being moved along an edge of the flat item when the marking/cutting tool is making the mark, score/cut line across the flat item. The stabilizing device includes a slightly concave tab member fabricated out of a substantially strong, durable and flexible material and a device for connecting the tab member to the end hook.

14 Claims, 4 Drawing Sheets

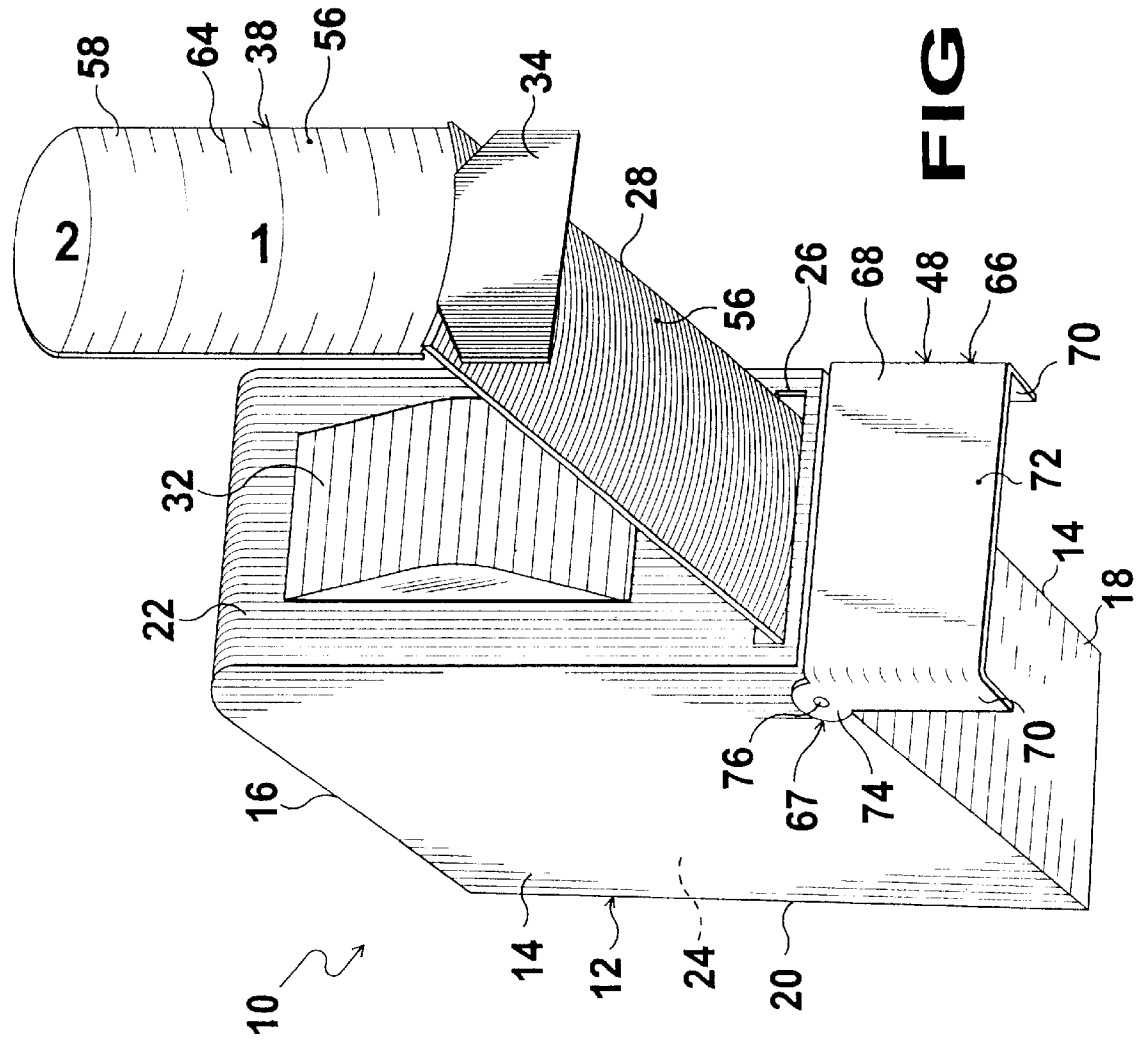

TAPE MEASURE WITH FINGER GRIP AND FINGER GUARD GUIDE

BACKGROUND OF THE INVENTION

1. Field of the Invention

The instant invention relates generally to measuring instruments and more specifically it relates to a tape measure with finger grip and finger guard guide.

2. Description of the Prior Art

Numerous measuring instruments have been provided in prior art. For example, U.S. Pat. Nos. 1,186,853 to Smith; 4,574,486 to Drechsler; 5,367,785 to Benarroch and 5,390,426 to Hull all are illustrative of such prior art. While these units may be suitable for the particular purpose to which they address, they would not be as suitable for the purposes of the present invention as heretofore described.

Smith, Edward F.

Rule

U.S. Pat. No. 1,186,853

In a measuring instrument a rigid terminal portion is cut away along one edge adjacent to its end. A plate is pivotally attached to the portion and has a finger adapted in one pivotal position of the plate, to lie adjacent to the cut away edge in substantial alignment with the edge. The plate has a stop adapted to contact the end of the portion to align the finger with the end of the portion when the plate is swung through ninety degrees.

Dreschler, Mark A.

Top Reading Rule Using Blades with Directional Arrows

U.S. Pat. No. 4,574,486

A top reading rule has a coilable blade with measuring indicia on both surfaces thereof. On its surface visible through the top reading window, the measuring indicia are offset from the outer end thereof and includes a longitudinally extending central band of a color distinct from the background and directional pointers spaced along the length of the band of a color distinct from that of the band. The pointers indicate the direction of increasing numbers so that a user may readily determine the length represented by graduations intermediate the numbers.

Benarroch, Isaac

Locking and Measuring Device

U.S. Pat. No. 5,367,785

A locking and measuring device which includes a housing having a top wall, a bottom wall, a first spaced end wall and a second spaced end wall. A first opening is in the first spaced end wall and a second opening is in the top wall. An extendable length of substantially strong and durable, yet bendable material has a terminal end. The length of material is normally, retractably stored in the housing with the terminal end at all times exteriorly accessible of the first opening. The terminal end of the length of material includes a locking end zone to be inserted into the second opening wherein it is matingly received and releasably captivated until released. Along the length of material graduated indicia are provided defining a measuring scale.

Hull, Anthony K.

Tape Measure Clip

U.S. Pat. No. 5,390,426

In accordance with the present invention, there is provided a clip for use with a tape measure comprising a generally U-shaped channel sized to permit a standard tape measure to be retained in the channel. The channel is provided with a horizontal slot cut in the lower edge of opposite sides of the channel adjacent one end. The slots are sized to permit the ruler of a square or other straight edge to be inserted and held in place between the bottom of the tape measure and the floor of the channel. This configuration permits the square and tape to move as one, so that the tape may be read as it passes over the outside edge of the edge of the blade of the square. A mark may be scribed at any point across the top of the material without hindrance and the user will have one hand free to scribe the mark.

SUMMARY OF THE INVENTION

A primary object of the present invention is to provide a tape measure with finger grip and finger guard guide that will overcome the shortcomings of the prior art devices.

Another object is to provide a tape measure with finger grip and finger guard guide, in which the finger grip being a tab member with indicia markings is hinged to an end hook on the rule blade, so that the tab member can be placed in a vertical position and gripped by fingers of a first hand of a person to stabilize a marking/cutting tool, such as a pencil or knife on a flat item to make a mark, score or cut line thereon.

An additional object is to provide a tape measure with finger grip and finger guard guide, in which the finger guard guide being pivotally attached to a forward bottom edge of a casing of the tape measure and pivoted to a vertical position will protect a finger of a second hand of the person grasping the casing when the finger guard guide is moved along an edge of the flat item, when the marking/cutting tool is making the mark, score or cut line thereon.

A further object is to provide a tape measure with finger grip and finger guard guide that is simple and easy to use.

A still further object is to provide a tape measure with finger grip and finger guard guide that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 4 is a bottom perspective view taken in the direction of arrow 4 in FIG. 1 of the instant invention per se.

Similar reference characters denote corresponding features consistently throughout the attached drawings.

DETAILED DESCRIPTION OF THE PREFERRED EMBODIMENTS

Figure 1:
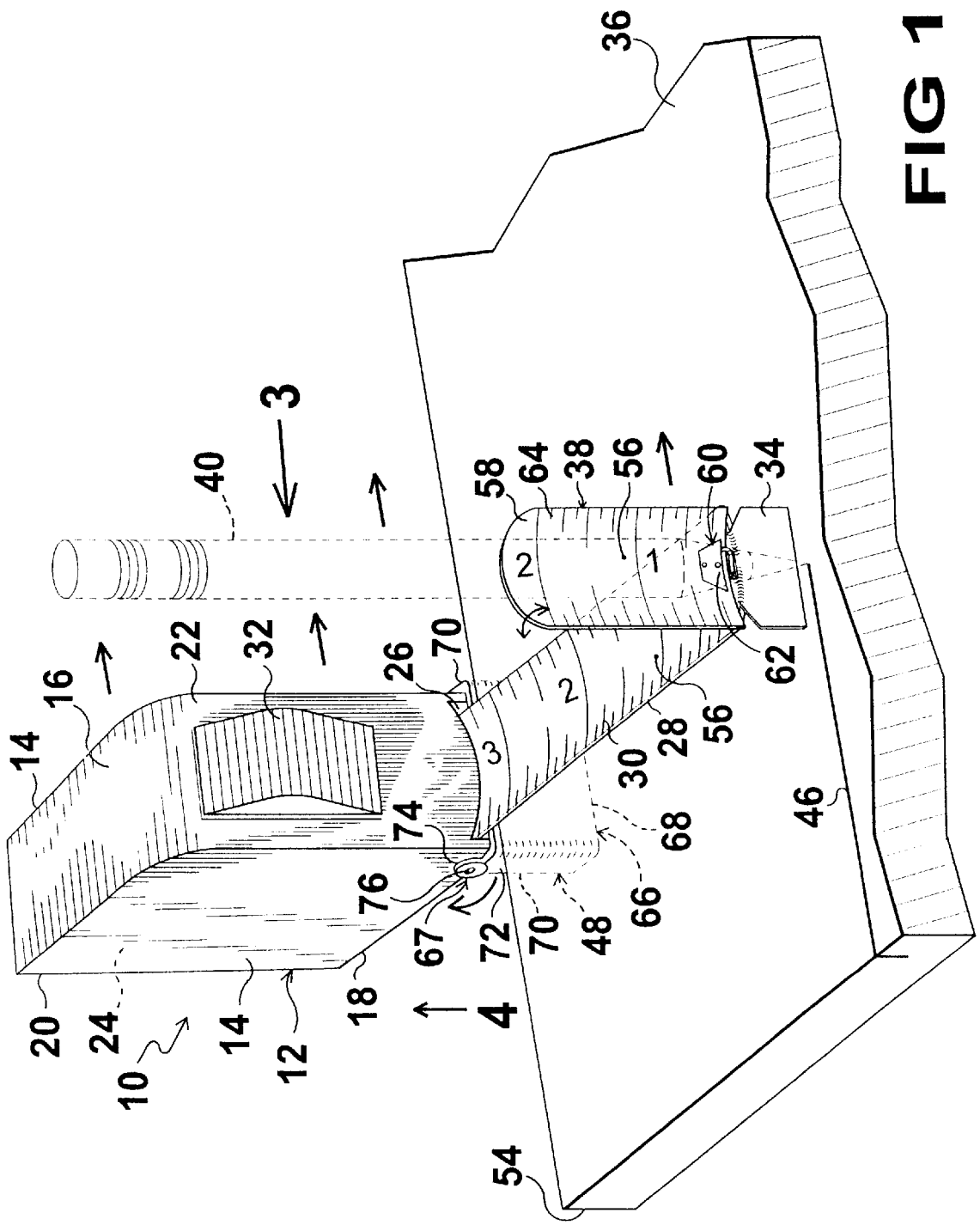
FIG. 1 is a top perspective view of a flat item with the instant invention in position to allow a marking/cutting tool, being a pencil, to make a mark or score line upon the flat item.
Figure 2:
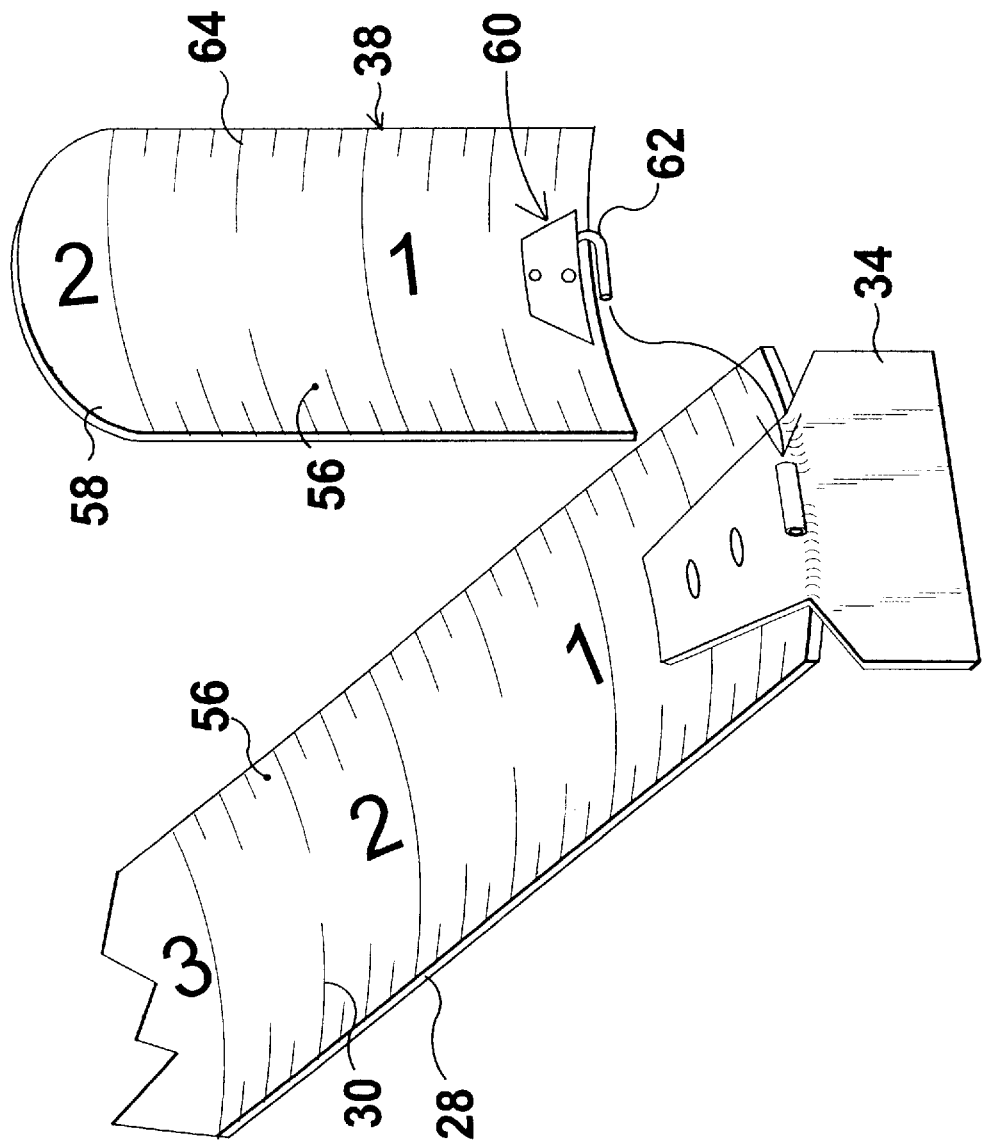
FIG. 2 is a top perspective view of a portion of the rule blade, showing the tab member with graduated indicia markings ready to be connected to the end hook by a hinge.

Turning now descriptively to the drawings, in which similar reference characters denote similar elements throughout the several views, FIGS. 1 to 4 illustrate a tape measure 10 comprising a casing 12 having two side walls 14, a top wall 16, a bottom wall 18, a rear wall 20 and a front wall 22 defining an enclosure 24. The front wall 22 has a blade aperture 26 adjacent the bottom wall 18. A rule blade 28 is normally retractably stored in a coiled condition within the enclosure 24 of the casing 12. An inner end of the rule blade 28 is secured within the enclosure 24, while an outer end of the rule blade 28 protrudes through the blade aperture 26. Graduated indicia markings 30 are along the length of the rule blade 28, so as to function as a measuring scale.

A lock and automatic rewind switch 32 can be carried on the front wall 22 of the casing 12, to keep a portion of the rule blade 28 in an extended locked position through the blade aperture 26 in the casing 12. The switch 32 is manually operated to retract the rule blade 28 back into the enclosure 24 of the casing 12. An end hook 34 is attached to the outer end of the rule blade 28. The end hook 34 is adapted to be normally laid over an edge of a flat item 36, such as a piece of plasterboard, to be measured.

Figure 3:
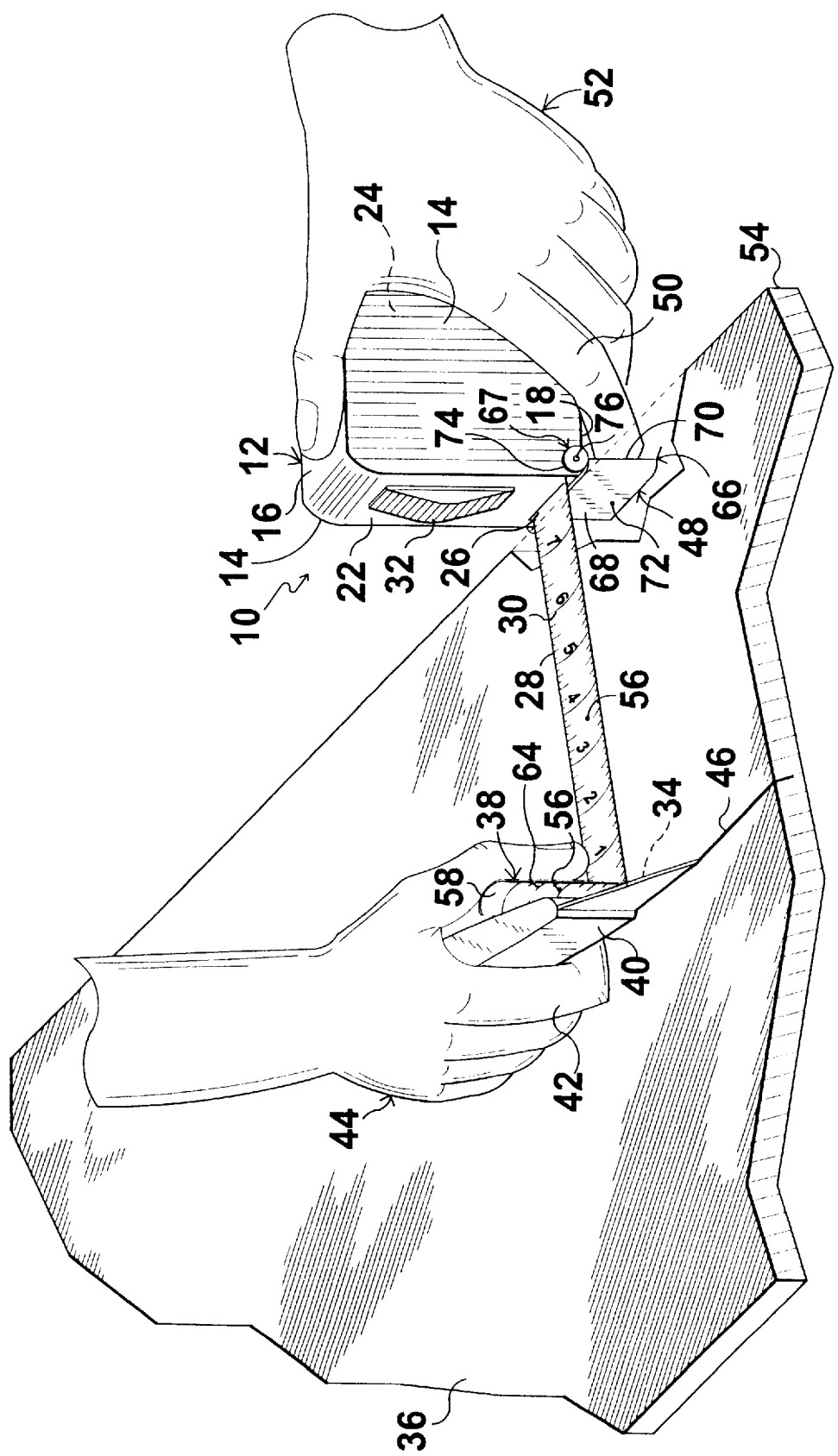
FIG. 3 is a side perspective view taken in the direction of arrow 3 in FIG. 1, showing the hands of a person engaging the instant invention, so that the marking/cutting tool, being a knife, will make a score or cut line upon the flat item.

An assembly 38 on the end hook 34, is for stabilizing a marking/cutting tool 40, such as a pencil in FIG. 1, or a knife in FIG. 3. The marking/cutting tool 40 can be grasped by fingers 42 of a first hand 44 of a person, to make a mark, a score or cut line 46 across the flat item 36. A facility 48 on the casing 12, is for protecting an index finger 50 of a second hand 52 of the person holding onto the casing 12 being moved along an edge 54 of the flat item 36, when the marking/cutting tool 40 is making the mark, score or cut line 46 across the flat item 36.

The rule blade 28 is elongated, slightly concave and fabricated out of a substantially strong, durable and flexible material 56. The stabilizing assembly 38 includes a tab member 58 and a component 60, for connecting the tab member 58 to the end hook 34. The tab member 58 is slightly concave and fabricated out of the substantially strong, durable and flexible material 56. The component 60 can also connect the tab member 58 directly to the outer end of the rule blade 28 without the end hook 34.

The connecting component 60 is a hinge 62 between the end hook 34 and the tab member 58. The tab member 58 can fold down onto the rule blade 28 when not being used. The tab member 58 can fold up into a vertical position when being used. Graduated indicia markings 64 are along the length of the tab member 58 to function as a measuring scale. When the tab member 58 folds down onto the rule blade 28, the graduated indicia markings 64 on the tab member 58 will match up with the graduated indicia markings 30 on the rule blade 28.

The protecting facility 48 consists of a finger guard guide 66. An assemblage 67 is for attaching in a pivotable manner the finger guard guide 66 to the side walls 14, at a juncture of the front wall 22 with the bottom wall 18 of the casing 12. The finger guard guide 66 is a plate 68 being slightly wider than the casing 12 and having two curved side portions 70 that extend back along the side walls 14 of the casing 12. The finger guard guide 66 produces a smooth gliding motion when being moved along the edge 54 of the flat item 36, while keeping the index finger 50 of the second hand 52 away from the edge 54 of the flat item 36. This makes it steady and eliminates abrasion of the index finger 50, so that the index finger 50 is not touching the edge 54.

The finger guard guide 66 is fabricated out of a substantially strong, durable and stiff material 72. The attaching assemblage 67 comprises a pair of rotatable members 74. Each rotatable member 74 is integral with and extends up from one curved side portion 70 of the plate 68. A pair of studs 76 are also provided. Each stud 76 extends through one rotatable member 74 and into one side wall 14 of the casing 12. The finger guard guide 66 can fold up against the bottom wall 18 of the casing 12 when not being used. The finger guard guide 66 can fold down into a vertical position when being used. Other types of attaching assemblages 67 can be utilized, such as screws, rivets, springs or tongues and grooves, not shown in the drawings.

OPERATION OF THE INVENTION

To use the tape measure 10, the following steps should be taken:

1. Flip down the finger guard guide 66.

2. Grasp the casing 12 with the fingers 50 of the second hand 52.

3. Butt the finger guard guide 66 against the edge 54 of the flat item 36.

4. Manually release the lock and automatic rewind switch 32, to unlock the rule blade 28, if the tape measure 10 is provided with the lock and automatic rewind switch 32.

5. Extend the rule blade 28 to the desired length needed and reset the switch 32.

6. Flip up the tab member 58.

7. Place the marking/cutting tool 40 against the end hook 34 and tab member 58.

8. Hold the marking/cutting tool 40 and the tab member 58 with the fingers 42 of the first hand 44.

9. Move the finger guard guide 66 along the edge 54 of the flat item 36, so that the marking/cutting tool 40 will make the mark, score or cut line 46 across the flat item 36.

| LIST OF REFERENCE NUMBERS | |
| --- | --- |
| 10 | tape measure |
| 12 | casing of 10 |
| 14 | side wall of 12 |
| 16 | top wall of 12 |
| 18 | bottom wall of 12 |
| 20 | rear wall of 12 |
| 22 | front wall of 12 |
| 24 | enclosure in 12 |
| 26 | blade aperture in 22 |
| 28 | rule blade of 10 |
| 30 | graduated indicia markings on 28 |
| 32 | lock and automatic rewind switch of 10 |
| 34 | end hook of 10 on 28 |
| 36 | flat item |
| 38 | stabilizing assembly of 10 on 34 |
| 40 | marking/cutting tool (pencil or knife) |
| 42 | finger of 44 |

-continued

LIST OF REFERENCE NUMBERS

| | |
|---|---|
| 44 | first hand |
| 46 | mark, score or cut line on 36 |
| 48 | protecting facility of 10 |
| 50 | index finger of 52 |
| 52 | second hand |
| 54 | edge of 36 |
| 56 | strong, durable and flexible material for 28 and 58 |
| 58 | tab member of 38 |
| 60 | connecting component of 38 |
| 62 | hinge for 60 |
| 64 | graduated indicia markings on 58 |
| 66 | finger guard guide of 48 |
| 67 | attaching assemblage of 48 |
| 68 | plate for 66 |
| 70 | curved side portion of 68 |
| 72 | strong, durable and stiff material for 66 |
| 74 | rotatable member of 67 |
| 76 | stud of 67 |

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A tape measure comprising:
   a) a casing having two side walls, a top wall, a bottom wall, a rear wall and a front wall defining an enclosure, said front wall having a blade aperture adjacent said bottom wall;
   b) a rule blade normally retractably stored in a coiled condition within said enclosure of said casing, with an inner end of said rule blade secured within said enclosure, while an outer end of said rule blade protrudes through said blade apreture;
   c) graduated indicia markings along the length of said rule blade, so as to function as a measuring scale;
   d) a lock and automatic rewind switch carried on said front wall of said casing to keep a portion of said rule blade in an extended locked position through said blade aperture in said casing, until said switch is manually operated to retract said rule blade back into said enclosure of said casing;
   e) an end hook attached to said outer end of said rule blade, whereby said end hook is adapted to be normally laid over an edge of a flat item to be measured;
   f) means on said end hook, for stabilizing a marking/cutting tool, so that the marking/cutting tool can be grasped by fingers of a first hand of a person to make a mark, score/cut line across the flat item; and
   g) means on said casing for protecting an index finger of a second hand of the person holding onto said casing being moved along an edge of the flat item when the marking/cutting tool is making the mark, score/cut line across the flat item, wherein said stabilizing means includes a tab member being slightly concave and fabricated out of a substantially strong, durable and flexible material; and means for connecting said tab member to said end hook.

2. A tape measure as recited in claim 1, wherein said rule blade is elongated, slightly concave and fabricated out of a substantially strong, durable and flexible material.

3. A tape measure as recited in claim 2, wherein said connecting means is a hinge between said end hook and said tab member, so that said tab member can fold down onto said rule blade when not being used and said tab member can fold up into a vertical position when being used.

4. A tape measure as recited in claim 3, further including graduated indicia markings along the length of said tab member to function as a measuring scale, so that when said tab member folds down onto said rule blade said graduated indicia markings on said tab member will match up with said graduated indicia markings on said rule blade.

5. A tape measure as recited in claim 4, wherein said protecting means includes:
   a) a finger guard guide; and
   b) means for attaching in a pivotable manner said finger guard guide to said side walls, at a juncture of said front wall with said bottom wall of said casing.

6. A tape measure as recited in claim 5, wherein said finger guard guide is a plate being slightly wider than said casing and having curved side portions that extend back along said side walls of said casing, so as to produce a smooth gliding motion when being moved along the edge of the flat item, while keeping the index finger of the second hand away from the edge of the flat item.

7. A tape measure as recited in claim 6, wherein said finger guard guide is fabricated out of a substantially strong, durable and stiff material.

8. A tape measure as recited in claim 7, wherein said attaching means includes:
   a) a pair of rotatable members, each said rotatable member being integral with and extending up from one said curved side portion of said plate; and
   b) a pair of studs, each said stud extending through one said rotatable member and into one said side wall of said casing, so that said finger guard guide can fold up against said bottom wall of said casing when not being used and said finger guard guide can fold down into a vertical position when being used.

9. A tape measure as recited in claim 1, wherein said connecting means is a hinge between said end hook and said tab member, so that said tab member can fold down onto said rule blade when not being used and said tab member can fold up into a vertical position when being used.

10. A tape measure as recited in claim 9, further including graduated indicia markings along the length of said tab member to function as a measuring scale, so that when said tab member folds down onto said rule blade said graduated indicia markings on said tab member will match up with said graduated indicia markings on said rule blade.

11. A tape measure as recited in claim 1, wherein said protecting means includes:
   a) a finger guard guide; and b) means for attaching in a pivotable manner said finger guard guide to said side walls, at a juncture of said front wall with said bottom wall of said casing.

12. A tape measure as recited in claim 11, wherein said finger guard guide is a plate being slightly wider than said casing and having two curved side portions that extend back along said side walls of said casing, so as to produce a smooth gliding motion when being moved along the edge of the flat item, while keeping the index finger of the second hand away from the edge of the flat item.

13. A tape measure as recited in claim 1, wherein said finger guard guide is fabricated out of a substantially strong, durable and stiff material.

14. A tape measure as recited in claim 11, wherein said attaching means includes:

a) a pair of rotatable members, each said rotatable member being integral with and extending up from one said curved side portion of said plate; and b) a pair of studs, each said stud extending through one said rotatable member and into one said side wall of said casing, so that said finger guard guide can fold up against said bottom wall of said casing when not being used and said finger guard guide can fold down into a vertical position when being used.

\* \* \* \* \*